(12) United States Patent
Lee

(10) Patent No.: US 6,496,234 B1
(45) Date of Patent: Dec. 17, 2002

(54) LIQUID CRYSTAL PANEL HAVING ETCHED TEST ELECTRODES

(75) Inventor: Jae Kyun Lee, Kyunggi-do (KR)

(73) Assignee: LG LCD, Inc., Seoul (KR)

(*) Notice: Subject to any disclaimer, the term of this patent is extended or adjusted under 35 U.S.C. 154(b) by 0 days.

(21) Appl. No.: 09/398,105

(22) Filed: Sep. 16, 1999

(51) Int. Cl.$^7$ ............................................. G02F 1/1333
(52) U.S. Cl. ............................ 349/40; 349/187; 438/30
(58) Field of Search ........................... 349/187, 40, 41; 438/30

(56) References Cited

U.S. PATENT DOCUMENTS 5,445,711 A * 8/1995 Tanski et al. ................. 216/13
6,310,666 B1 * 10/2001 Moon ........................... 349/40

FOREIGN PATENT DOCUMENTS

KR         9416852       12/1992

* cited by examiner

Primary Examiner—Toan Ton
Assistant Examiner—Thoi Van Duong
(74) Attorney, Agent, or Firm—Birch, Stewart, Kolasch & Birch, LLP

(57) ABSTRACT

A method of manufacturing a liquid crystal panel prevents the introduction of static electricity from the exterior of a liquid crystal panel. According to the method, edges of a lower glass substrate on which a liquid crystal material layer and an upper glass substrate are disposed are dipped into an etchant. At this time, the ends of the test electrodes formed on the lower glass substrate are removed. The ends of the test electrodes are removed, and consequently an introduction path of stripe-shaped defect is not generated within the liquid crystal panel. Also, the yield of the liquid crystal panel is greatly improved.

11 Claims, 3 Drawing Sheets

LIQUID CRYSTAL PANEL HAVING ETCHED TEST ELECTRODES

BACKGROUND OF THE INVENTION

1. Field of the Invention

The present invention relates to a liquid crystal display, and more particularly, to a method of eliminating static electricity introduced from the exterior of the liquid crystal display (LCD).

2. Description of the Prior Art

Generally, static electricity is substantially stationary as an electric charge existing on a nonconductor and is produced by friction or an electrostatic induction, or other such conditions. Static electricity creates problems in a liquid crystal panel during a manufacturing process of the liquid crystal panel so as to cause a reduction in a manufacturing yield of the liquid crystal panel.

For instance, as shown in FIG. 1, the conventional liquid crystal panel includes a thin film transistor (TFT) matrix 20 formed on a lower glass substrate 10, a shorting bar for gate lines 22 for testing gate lines of the TFT matrix 20, and a shorting bar for data lines 24 for testing data lines of the TFT matrix 20. The gate lines of the TFT matrix 20 are connected to the gate line shorting bar 22 via gate line test electrodes 16 while the data lines of the TFT matrix 20 are connected to the data line shorting bar 24 via data line test electrodes 18.

The upper end of the lower glass substrate 10 is provided with a gate pad area 10a including a gate driving integrated circuit(IC), and the left end of the lower glass substrate 10 is provided with a data pad area 10b including a data driving IC. Further, the center of the lower glass substrate 10 is provided with the TFT matrix 20 switched by control signals and video signals of the gate and data driving ICs.

The shorting bars 22 and 24 are connected to the TFT matrix 20 to test a characteristic of the TFT. For this purpose, the shorting bars 22 and 24 are connected to the gate line test electrodes 16 and the data line test electrodes 18, respectively, each of which is connected to the gate lines and the data lines of the TFT matrix 20, thereby forming an electrical path along with the TFT matrix 20. Also, the shorting bars 22 and 24 deliver a test signal from outside of the TFT matrix 20 into the interior of the TFT matrix 20 to test the TFT matrix 20. Such a characteristic test of the TFT matrix 20 is carried out after the TFT matrix 20 has been formed on the lower glass substrate and before a liquid crystal material is disposed thereon. Since the shorting bars 22 and 24 can be formed on the gate pad area 10a and the data pad area 10b due to a structural characteristic of the LCD, the shorting bars 22 and 24 are located at the opposite edges of the gate pad area 10a and the data pad area 10b. Such a structural characteristic may be applied to a liquid crystal panel of a chip on glass (COG) type or a TFT panel manufactured by a low-temperature poly-silicon process.

A liquid crystal material layer 14 and an upper glass substrate 12 are sequentially disposed on the lower glass substrate 10 which has been determined to be normal by the test of the TFT matrix 20 as described above. The lower glass substrate 10 along with the liquid crystal material layer 14 and the upper glass substrate 12 disposed on the lower glass substrate 10 is cut off along lines A–A' and B–B' as shown in FIG. 1, thereby providing a liquid crystal panel shown in FIG. 2.

However, the cut gate line test electrodes 16 and data line test electrodes 18 are exposed at the edge of the lower glass substrate 10 of the liquid crystal panel having a sequentially disposed structure as shown in FIG. 2. The exposed test electrodes 16 and 18 apply static electricity from the exterior to the gate lines and data lines of the TFT matrix 20, respectively. This application of static electricity causes damage to the TFTs included in the TFT matrix 20. As a result, a stripe-shaped defect is generated at the liquid crystal panel and a manufacturing yield of the liquid crystal panel is reduced.

SUMMARY OF THE INVENTION

To overcome the problems described above, preferred embodiments of the present invention provide a method of manufacturing a liquid crystal panel so as to prevent an introduction of static electricity from the exterior of the liquid crystal panel.

In order to achieve these and other advantages provided by preferred embodiments of the present invention, a method according to one aspect of preferred embodiments of the present invention includes an etching step for removing the ends of test electrodes formed on a lower glass substrate on which a liquid crystal material layer and an upper glass substrate are disposed.

BRIEF DESCRIPTION OF THE DRAWINGS

These and other objects of the invention will be apparent from the following detailed description of preferred embodiments of the present invention with reference to the accompanying drawings, in which.

DETAILED DESCRIPTION OF PREFERRED EMBODIMENTS

A method of manufacturing a liquid crystal panel according to a preferred embodiment of the present invention includes an etching process for etching an electrode. The etching process is performed to etch gate line test electrodes 16 and data line test electrodes 18 included in a liquid crystal panel shown in FIG. 2. Such an etching process is carried out after a liquid crystal material layer 14 and an upper glass substrate disposed on a lower glass substrate 10 along with the lower glass substrate 10 have been cut off along lines I–I and II–II shown in FIG. 1.

Figure 1:
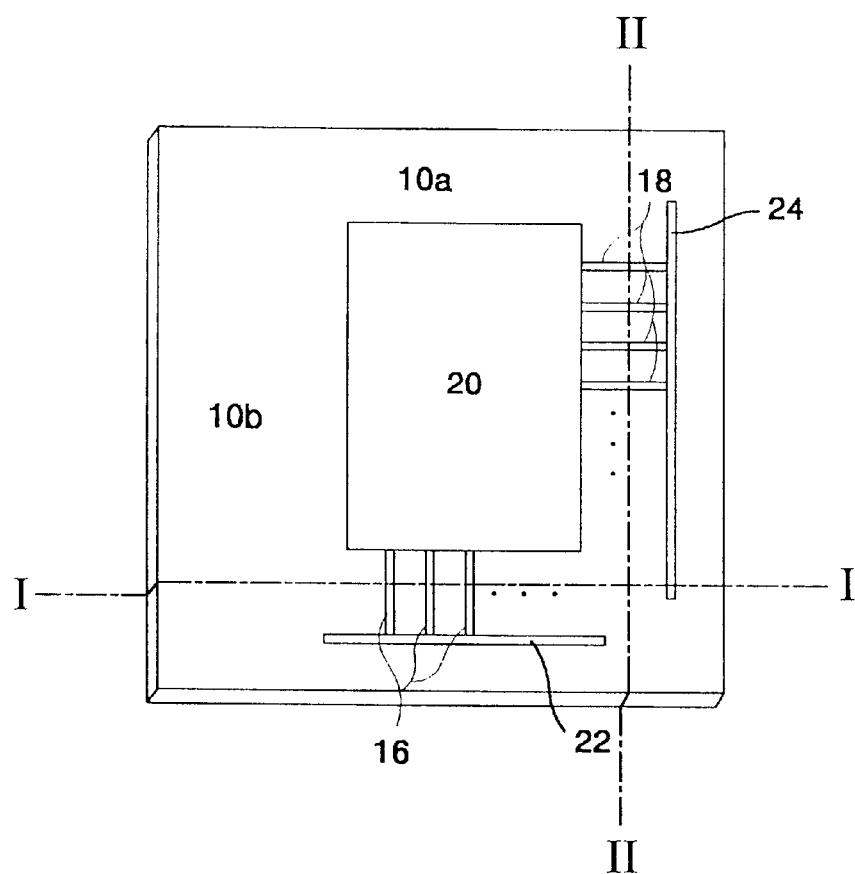
FIG. 1 is a view showing the structure of a lower glass substrate in the conventional liquid crystal panel.
Figure 2:
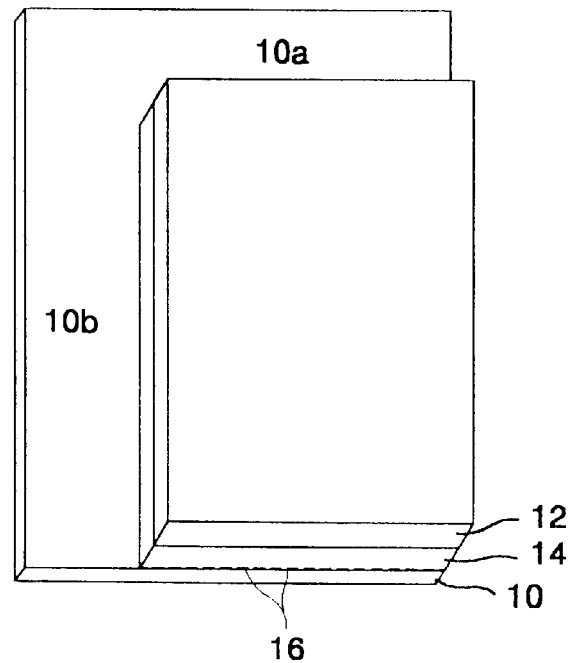
FIG. 2 is a schematic view showing the structure of the conventional liquid crystal panel.

As shown in FIG. 1, the lower glass substrate 10 preferably includes a TFT matrix 20, a gate line shorting bar 22, a data line shorting bar 24, gate line test electrodes 16 and data line test electrodes 18. The gate line test electrodes 16 and the data line test electrodes 18 are exposed from the edge. surfaces of the liquid crystal panel after the cutoff process has been completed, as described above.

In the preferred embodiments of the present invention, the exposed test electrodes 16 and 18 are etched at a time when the pad areas and the edge surfaces of the upper glass substrate 12, the liquid crystal material layer 14 and the lower glass substrate 10 are dipped into an etchant. As a result, the test electrodes 16 and 18 are not exposed from the edge surfaces of the liquid crystal panel.

Figure 3:
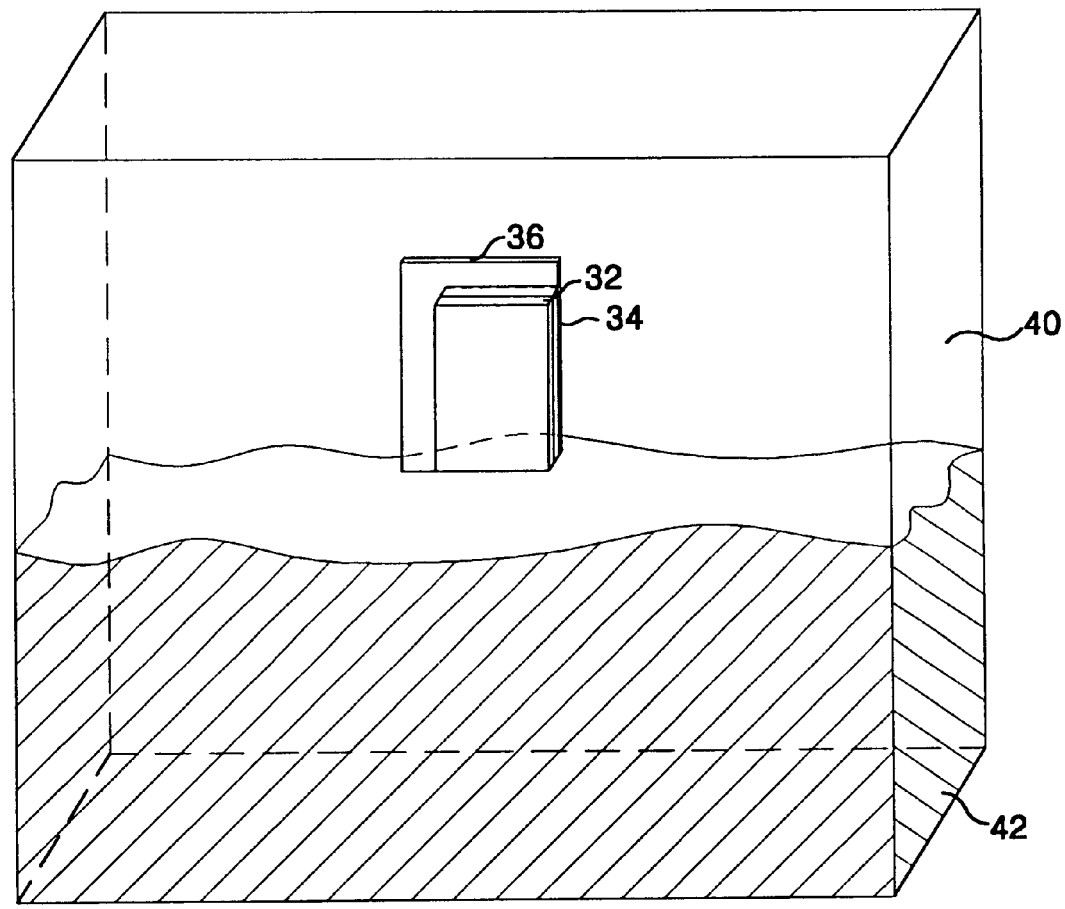
FIG. 3 is a view for explaining an etching process involved in a liquid crystal panel manufacturing method according to a preferred embodiment of the present invention.

FIG. 3 more specifically shows a process of etching the gate line test electrodes. Referring to FIG. 3, a vessel 40 filled with an etchant 42 is shown. An etching liquid for removing an indium tin oxide electrode is preferably used as the etchant 42.

The lower edges of a liquid crystal material layer 34 and an upper glass substrate 32 disposed on a lower glass substrate 36 sequentially along with the lower edge of the lower glass substrate 36 are dipped into the etchant 42 for a certain time.

Figure 4:
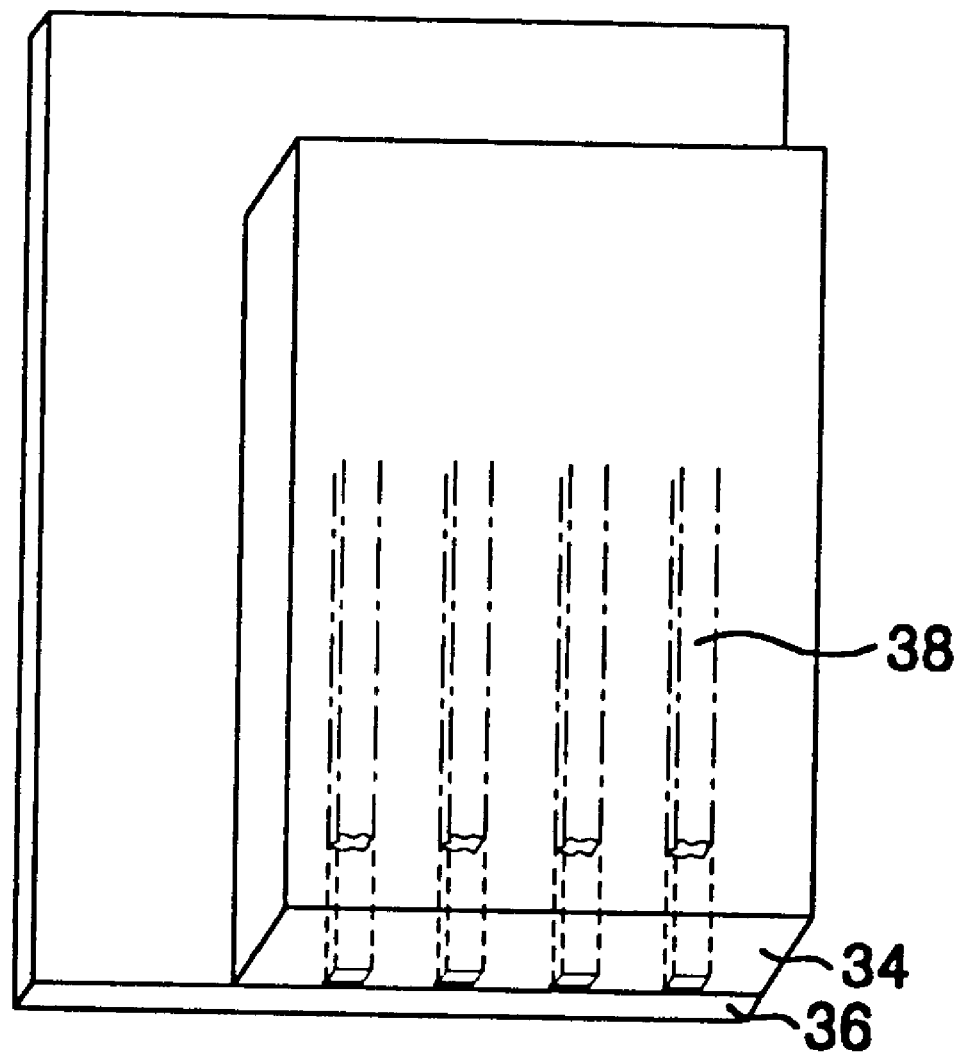
FIG. 4 is a schematic view of a liquid crystal panel made by the liquid crystal panel manufacturing method according to a preferred embodiment of the present invention.

At this time, the exposed portion of each gate line test electrode 38 disposed on the lower glass substrate 36 is etched to remove the ends of the gate line test electrodes 38 as shown in FIG. 4. It can be seen from FIG. 4 that the ends of the gate line test electrodes 38 have been removed from the edge surfaces of the lower glass substrate 36, the liquid crystal material layer 34 and the upper glass substrate 32, such that the ends of the gate line test electrodes 38 are located within an inner portion of the lower glass substrate 36. Similar to the gate line test electrodes 38, the data line test electrodes also are etched to thereby remove the ends of the data line test electrodes from the edge surfaces of the lower glass substrate 36, the liquid crystal material layer 34 and the upper glass substrate 32, such that the ends of the data line test electrodes are located within an inner portion of the lower glass substrate 36.

The ends of the gate line test electrodes and the ends of the data line test electrodes are moved from the edge surfaces into the inner portion as described above, so that an introduction path of static electricity extending into the TFT matrix on the lower glass substrate 36 is eliminated. Accordingly, the TFTs in the TFT matrix are not damaged. As a result, in the liquid crystal panel manufactured by a liquid crystal manufacturing method according to preferred embodiments of the present invention, a strip-shaped defect caused by static electricity is not generated. Furthermore, the liquid crystal panel manufacturing method according to preferred embodiments of the present invention greatly improves a manufacturing yield of the liquid crystal panel.

As described above, in the liquid crystal panel manufacturing method according to preferred embodiments of the present invention, the ends of the test electrodes are removed by the etching process to thereby cut off an external introduction path of static electricity. Accordingly, the TFTs on the liquid crystal panel are not damaged, and a stripe-shaped defect is not generated in the liquid crystal panel. Moreover, the liquid crystal panel manufacturing method according to preferred embodiments of the present invention greatly improves the manufacturing yield of the liquid crystal panel.

Although the present invention has been explained with reference to preferred embodiments shown in the drawings described above, it should be understood to the ordinary skilled person in the art that the invention is not limited to the above-described preferred embodiments, but rather that various changes or modifications thereof are possible without departing from the spirit of the invention. Accordingly, the scope of the invention shall be determined only by the appended claims and their equivalents.

What is claimed is:

1. A method of manufacturing a liquid crystal panel, comprising the steps of:

providing a lower glass substrate having test electrodes disposed thereon;

disposing a liquid crystal material layer on the lower glass substrate;

disposing an upper glass substrate on the liquid crystal material layer and the lower glass substrate; and etching portion of the test electrodes to remove end portions of the test electrodes from the lower glass substrate, the etching step including dipping at least the lower glass substrate in a container filled with etchant.

2. The method according to claim 1, further comprising the step of cutting the test electrodes before the step of etching.

3. The method according to claim 1, wherein the test electrodes include at least one of gate line test electrodes and data line test electrodes.

4. The method according to claim 1, wherein the test electrodes are exposed from the edge surfaces of the lower glass substrate before the step of etching and are removed from the edge surfaces of the lower glass substrate during the etching step.

5. The method according to claim 1, wherein the etching step includes the step of dipping the lower glass substrate, the liquid crystal material layer and the upper glass substrate into a container filled with etchant.

6. The method according to claim 1, wherein the etchant is a liquid which removes indium tin oxide electrode material.

7. The method according to claim 1, wherein only lower edges of the lower glass substrate are dipped into the container filled with etchant.

8. The method according to claim 5, wherein only lower edges of the lower glass substrate, the liquid crystal material layer and the upper glass substrate are dipped into the container filled with etchant.

9. The method according to claim 1, wherein after the etching step is performed, the ends of the test electrodes are located within an inner portion of the lower glass substrate.

10. The method according to claim 1, wherein a plurality of the test electrodes are etched simultaneously during the etching step.

11. The liquid crystal manufacturing method as claimed in claim 1, wherein said etching step comprises:

dipping any one of edges of the lower glass substrate corresponding to a gate pad area and a data pad area into an etchant; and dipping the other edge of the lower glass substrate into the etchant.

* * * * *